United States Patent
Dirschlmayr et al.

(10) Patent No.: US 11,577,384 B2
(45) Date of Patent: Feb. 14, 2023

(54) BRAKE PATH MONITORING OF A KINEMATIC

(71) Applicant: B&R INDUSTRIAL AUTOMATION GMBH, Eggelsberg (AT)

(72) Inventors: Thomas Dirschlmayr, Eugendorf (AT); Thomas Kapeller, Hallwang (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 973 days.

(21) Appl. No.: 16/386,714

(22) Filed: Apr. 17, 2019

(65) Prior Publication Data
US 2019/0321975 A1      Oct. 24, 2019

(30) Foreign Application Priority Data

Apr. 18, 2018   (EP) ..................... 18168059

(51) Int. Cl.
*B25J 9/16*        (2006.01)
(52) U.S. Cl.
CPC ........... *B25J 9/1605* (2013.01); *B25J 9/1666* (2013.01); *B25J 9/1671* (2013.01)
(58) Field of Classification Search
CPC ...... B25J 9/1605; B25J 9/1666; B25J 9/1671; B25J 9/1676; B25J 9/16; B25J 9/1664; B25J 9/1674; B25J 9/1692
See application file for complete search history.

(56) References Cited

U.S. PATENT DOCUMENTS

2017/0112580 A1* 4/2017  Griffiths ................ A61B 34/35

FOREIGN PATENT DOCUMENTS

EP      2 072 195      6/2009

OTHER PUBLICATIONS

EP Search Report/Office Action issued in EP 18 16 8059.
Zanchettin et al., "Safety in Human-Robot Collaborative Manufacturing Environments: Metrics and Control", IEEE Transactions on Automation Science and Engineering, IEEE Service Center, New York, NY, US, Bd. 13, Nr. 2, XP011605470, ISSN: 1545-5955, Apr. 1, 2016, pp. 882-893.
Dietz et al., "Simulation of the stopping behavior of industrial robots using a complementary-based approach", Advanced Intelligent Mechatronics (AIM), 2011 IEEE/ASME Intenational Conference on, IEEE, XP032053515, Jul. 3, 2011, pp. 428-433.

* cited by examiner

*Primary Examiner* — Basil T. Jos
(74) *Attorney, Agent, or Firm* — Greenblum & Bernstein, P.L.C.

(57) ABSTRACT

For a kinematic modelled in a kinematics coordinate system by hingedly interconnected single axles, a method calculates a braking region possibly covered by at least one of the single axles connected to an origin of the kinematics coordinate system and at least one of the single axles moving relative to the origin. In the event of a braking process, for a point that is coupled to a single axle, at least one virtual end position of the point is determined from an initial position of the point, a vectorial speed of at least one single axle, and a minimum deceleration of at least one single axle. The braking region of the point is determined using an envelope of the initial position and the at least one virtual end position, the extent of the envelope being calculated from the initial position and the at least one virtual end position.

16 Claims, 6 Drawing Sheets

BRAKE PATH MONITORING OF A KINEMATIC

CROSS-REFERENCE TO RELATED APPLICATION

This application claims priority under 35 U.S.C. § 119(a) of Europe Patent Application No. 18 168 059.6 filed Apr. 18, 2018, the disclosure of which is expressly incorporated by reference herein in its entirety.

The present invention relates to a method for controlling a kinematic that is modelled in a kinematics coordinate system by means of hingedly interconnected single axles, at least one of the single axles being connected to an origin of the kinematics coordinate system and at least one of the single axles moving relative to the origin.

Since manufacturing processes in the field of robotics are intended to be achieved in increasingly small spaces, the fields of operation of robots (also referred to, in a general manner, as kinematics) often overlap with those of other objects such as fixed installations, robots, machines or people. Kinematics is understood both as serial kinematics and parallel kinematics, but also mixtures thereof, a serial or parallel kinematic comprising, in a known manner, a number of joints that are interconnected, in series or in parallel, by means of rigid connecting elements (e.g. tripod or hexapod). In order to be able to ensure frictionless running, it is therefore necessary to ensure that no collisions occur between a robot and other objects in said shared working spaces. Likewise, working regions and/or safety regions which kinematics, or portions thereof, may not leave or may not pass, are often defined in a kinematics working space. Protection for people and objects has to be ensured, in particular owing to high and increasing safety requirements.

Various models of collision monitoring already exist, which models are usually a compromise among precision, flexibility and required processing power. Usually, both robot (parts) and working space boundaries are approximated using geometric bodies (spheres, pyramids, voxels) and are continuously checked, during the movement of the robot, with regard to whether there are spatial overlaps between said geometric bodies. This ensures that a robot does not leave a particular working region (work space) or does not enter a particular safety region (safe space). This is usually achieved by means of calculating intersection points/intersection lines/intersection planes of geometric bodies (e.g. between an approximated robot arm and a safety region), but this is CPU-intensive. In particular in the field of safety, however, less computational effort, and thus a quick reaction time, is desirable. The shorter the reaction time, the later the robot has to react to critical situations. In addition to the position, a brake path of a kinematic during operation should also be taken into account. If a braking process is initiated at a braking time, the joints and arms of the robot continue to move until they remain in an end position. It is necessary to ensure that, when braking is initiated, the unavoidable braking movement of the kinematic never results in working spaces being left and safety regions being entered. A known approach for taking account of the brake path is that of assuming a circle or a sphere as a possible brake path, the radius of the circle or sphere resulting from the sum of the possible individual brake paths of single axles. Although this method is very efficient in terms of computing time, it is also very costly since the region that actually is or can be covered during a braking process is generally only a fraction of the determined brake path. This generously sized braking region can thus result in braking being initiated even though there is absolutely no risk of collision.

The object of the present invention is therefore that of specifying a method for controlling a kinematic, braking regions that may be covered by the kinematic during a braking process being calculated with a high degree of precision and efficiency.

This object is achieved in that, in the event of a braking process, for a point that is coupled to a single axle, at least one virtual end position of the point is determined from an initial position of the point, a vectorial speed of at least one single axle, and a minimum deceleration of at least one single axle, the extent of an envelope being calculated from the initial position and the at least one virtual end position. A braking region of the point is determined using the envelope of the initial position and the at least one end position, and the braking region is taken into account when controlling the kinematic. "Vectorial speed" means that the direction of the speed is also taken into account, in addition to the magnitude of the speed, the vectorial speed corresponding to the initial speed when the braking process is initiated. A vectorial speed of a moving revolute joint axle can be described as the angular speed along an associated axis of rotation, and a vectorial speed of a prismatic joint axle can be described as the speed along an associated thrust axis.

During the braking process, the relevant speed of course continues to decrease, owing to the deceleration that takes place. The determined virtual end position of course generally does not correspond to the actual end position of the point after the braking process, it nonetheless being possible for the point to reach the virtual end position if the relevant single axle is actually decelerated at the minimum deceleration and if no further single axles are involved in the movement or in the braking process. The minimum deceleration may be specified or calculated, and describes the deceleration at which the at least one single axle can be guaranteed to be decelerated during the braking process. This thus ensures that the point is guaranteed to come to a halt within the determined braking region. The minimum deceleration can be determined from the dynamic properties of portions of the kinematic, for example the mass of a single axle, both during operation of the kinematic and in advance. Of course, the minimum deceleration can also be specified in advance or during operation, e.g. as an external parameter, etc.

The deceleration of the at least one single axle counteracts the speed of the at least one single axle, and is thus a negative acceleration directed counter to the speed. The minimum deceleration of the single axle in question results, at the braking time, from an available braking torque, the load, etc., may also be related to the current speed, etc., or may also be known in advance. A specified minimum deceleration for a particular load of the kinematic can be derived from a datasheet for example. In order to achieve an additional safety factor, a lower value may be assumed for the minimum deceleration used in the method than the value for the specified minimum deceleration. As a result, it is possible to take account of an event in which e.g. a motor cannot brake the kinematic as strongly as specified owing to a malfunction, or an event in which the load of the kinematic is greater than specified, etc.

In contrast to the method according to the prior art, no kinematic object is modelled as a three-dimensional geometric body. Instead, for determining the brake path, at least one end position of a point of the kinematic can be considered to be the object to be monitored, the kinematics being modelled by means of a number of single axles (linear, i.e. one-dimensional objects) which for example each connect two kinematic objects, e.g. joint hubs (punctiform, i.e. zero-dimensional objects). In this case, the point considered may be located on a modelled single axle or on a kinematic object of the kinematic, but must at least be coupled to a single axle, e.g. move together with a single axle. In addition, however, the point may be located outside the kinematic (modelled by single axles and kinematic objects). The braking process is initiated at a braking time, at which the point is in the initial position. At least one virtual end position of the point is determined from the vectorial speed and the specified minimum deceleration of at least one single axle, and at least one braking vector can be determined from the initial position and the at least one virtual end position.

The envelope is a two-dimensional or three-dimensional object that bounds the at least one determined braking vector. In a simple manner, the envelope can exactly bound the at least one braking vector, although this is expedient only if the at least one braking vector does not or cannot deviate from the virtual partial movement of the point during the braking process. This situation occurs for example if just one braking vector is present which is in addition formed by the movement of just one prismatic joint axle.

Advantageously, the extent of the envelope E can be calculated from the initial position, the at least one virtual end position, and a virtual partial movement resulting therefrom.

A virtual partial movement is understood to be a possible trajectory which is determined, within the context of the method according to the invention, from the virtual end position, using the minimum deceleration. The actual trajectory as the actual movement path of the point during the braking process is, of course, unknown, inter glia because the deceleration that actually occurs is usually not known.

However, since a plurality of single axles are usually involved in the movement and in the braking process, the virtual partial movement of the point can generally not be considered a straight link from the starting point to the end point. The actual trajectory, as well as the actual end position, is not known. The envelope can, however, be selected such that all trajectories that may occur during the braking process are bounded by the envelope if, as is assumed, the minimum deceleration is adhered to. The virtual partial movements can then be calculated, proceeding from the starting point and at least one end point, and the envelope can be designed so as to bound all virtual partial movements as precisely as possible. This can result in complex geometries for the envelopes, which usually results in significant computational effort, but this can be kept low by means of suitable algorithms.

In order to reduce the computational effort, simple geometric shapes such as rectangles (in two-dimensional space) or cuboids (in three-dimensional space) can also be determined as the envelope, which shapes are calculated from the starting point and at least one end point (and must of course always bound the starting point and associated at least one end point or the virtual partial movements), as will be described in the following.

Advantageously, at least one virtual end position of the point is determined from the initial position of the point, a vectorial speed of each single axle moved, and a minimum deceleration of each single axle moved. As a result, the movement, i.e. the vectorial speed and the minimum deceleration, of each single axle is directly taken into account when determining the virtual end position. The vectorial speed of the point thus results as a linear combination of vectorial speeds of the single axles that are moved.

In general, at least one virtual end position of the point is determined from the vectorial speed and the specified minimum deceleration of at least one (or of each) single axle. It is possible, however, for at least one braking vector, which connects the initial position to the at least one virtual end position, to be determined, and for the extent of an envelope to be calculated from the at least one braking vector.

In a simple manner, the envelope can exactly bound the at least one braking vector, although this is expedient only if the at least one braking vector does not or cannot deviate from the virtual partial movement of the point during the braking process. This situation occurs for example if just one braking vector is present which is in addition formed by the movement of just one prismatic joint axle.

The braking vectors can advantageously be formed by a linear combination of basis braking vectors, each basis braking vector being assigned to one single axle and connecting the initial position of the point to an associated virtual end position of the point, the associated virtual end position of the point being determined from the initial position of the point, a vectorial speed of the assigned single axle, and the minimum deceleration of the assigned single axle, the assumption being made, for each basis braking vector, that the non-assigned single axles do not move any further. In order to determine braking region, the possible trajectory of the point is split into individual virtual partial movements. The end position of a point that follows a virtual partial movement of this kind corresponds to the virtual end position. The virtual partial movements quasi cover the "worst case" situation, since they are determined on the basis of the minimum deceleration. The braking region is determined by combining the individual virtual partial movements and corresponds to the region in which the actual trajectory would definitely be located, of course always assuming that at least the minimum deceleration is effective.

The extent of the envelope is approximated, according to the invention, from the braking vectors, the envelope ideally bounding all the virtual partial movements of the point such that the extent of the envelope is as small as possible.

At least some of the single axles may be formed as prismatic joint axles. When (just) one prismatic joint axle is extended, a virtual partial movement of a point describes a straight line, when the point considered is coupled to the relevant prismatic joint axle or is coupled to a single axle that is connected to the prismatic joint axle. The vectorial speed of a prismatic joint axle thus acts along said straight line. Said virtual partial movements thus correspond to the (basis) braking vectors when the single axle is decelerated at the minimum deceleration, and therefore it would be trivial to determine the virtual partial movement from the braking vectors. The trajectory of the point actually described during the braking process could also be shorter if the single axle is braked at a deceleration greater than the minimum deceleration.

When a plurality of prismatic joint axles is taken into account, determining an envelope having the smallest possible extent may nonetheless require increased effort. However, at least some of the single axles may be formed as revolute joint axles, with the result that it is not sufficient to consider braking vectors alone, because, on the basis of just this one revolute joint, the actual movement of the point is a circular arc. The vectorial speed of a revolute joint axle thus acts along said circular arc. The braking vector and circular arc accordingly differ by a circular segment. It would be fundamentally very complex to take account of this deviation in an arithmetically exact manner.

Advantageously, at least one further virtual end position of the point is determined for the point, from the initial position, the vectorial speed of the at least one single axle, and at least one further deceleration of the at least one single axle that is greater than the minimum deceleration of the at least one single axle. The braking region of the point is determined using an envelope of the initial position and the at least one end position and the at least one further end position, the extent of the envelope being calculated from the initial position, the at least one end position, and the at least one further end position. As a result, the virtual partial movement of the point can be approximated using further end positions that result from a deceleration greater than the minimum deceleration. If an infinite number of further end positions were determined, the virtual partial movement for all decelerations up to the minimum deceleration would result from the family of the initial position and end positions.

The envelope may also cover a wider region that is easier to calculate.

In the present description, for the purpose of improved clarity braking vectors are calculated, although it would always also be possible, in each case, to use the initial position and the at least one virtual end position instead of a braking vector. As a result, the envelope can thus be determined from the virtual partial movement and can advantageously exactly bound said partial movement.

The envelope can thus advantageously be calculated on a first rectangle that corresponds to a minimum bounding rectangle of the braking vectors or of the initial position and virtual end positions, and the sides of which rectangle are preferably in parallel with the kinematics coordinate system. The envelope can also be calculated, in an analogous manner, on a first cuboid that constitutes a minimum bounding cuboid of the braking vectors or of the initial position and virtual end positions, and the sides of which cuboid are in parallel with the kinematics coordinate system, which may be advantageous in order to consider the kinematic in three-dimensional space.

In this case, however, the minimum bounding cuboid or the minimum bounding rectangle bounds only the braking vectors, or the initial position and virtual end positions, which, as mentioned, may deviate from the virtual partial movements when revolute joint axles are used.

The first rectangle or the first cuboid may therefore be expanded, by a preferably direction-independent correction value which at least takes account of the deviation of the braking vectors from the virtual partial movements of the point from the initial position into the respective virtual end positions, to an expanded first rectangle or a first expanded first cuboid. The envelope is furthermore likewise expanded on the expanded first rectangle or the first expanded first cuboid. Using the correction value makes it possible to take account of revolute joint axles by means of the associated braking vectors (which are known to deviate from the virtual partial movements by a circular sector) being used to form the first rectangle. In the following, the deviations of the virtual partial movements from the braking vectors, in the form of the height of the respective circular sectors, can be added to the length and width of the rectangle in order to expand said rectangle to an expanded first rectangle. The correction value can also take account of direction-independent brake path portions, preferably position tolerances of the single axles. The correction value can also take account of direction-independent brake path portions which result from anticipated deviations between the calculated and the actual position. Said anticipated deviation can in turn result from known error response times, difference quotients, discretization errors, extrapolation inaccuracies, calculation inaccuracies, encoder and/or coupling resolutions, offset errors, mechanical deformations, etc.

Furthermore, using a working space coordinate system, in the working space, a safety region of the kinematic can be expanded by means of the envelope and/or a working region of the kinematic can be reduced by means of the envelope, resulting in a modified safety region or a modified working region.

It is also possible, however, for the first rectangle or the first cuboid to be expanded, by a correction value which at least takes account of the deviation of the braking vectors from the virtual partial movements of the point from the initial position into the respective virtual end positions, to an expanded first rectangle or a first expanded first cuboid, a safety region of the kinematic and/or a working region of the kinematic being provided in a working space using a working space coordinate system, the envelope being expanded to a second expanded rectangle or a second expanded cuboid, the sides of which touch the corners of the first expanded rectangle or of the first expanded cuboid and are in parallel with the working space coordinate system, and a safety region of the kinematic being expanded by means of the envelope and/or a working region of the kinematic being reduced by means of the envelope, resulting in a modified safety region or a modified working region. The adjustment of the working region to the reduced working region or of the safety region to the expanded protection region using the envelope can take place in a suitable manner.

The initial position of the point can advantageously be moved along the boundaries of the safety region or of the working region, and the modified safety region can be formed by the total of the safety region and envelope, and the modified working region can be formed by the difference between the working region and the envelope. The envelope is thus applied to the working space to be monitored (permitted working region or forbidden safety region). In this case, the working space is increased (in the case of the safety region) or reduced (in the case of the working region). In this case, it is not necessary to calculate any intersection points of two two-dimensional geometric bodies, but instead simply the intersection point between a point (kinematic object) or a line (single axle) and a zero-, one-, two- or three-dimensional working region. The kinematic itself is thus not modified, and therefore a kinematic object does not need to be treated as a two-dimensional or three-dimensional object.

The modified safety region or the modified working region can in addition be monitored, and an action can be taken as soon as the point enters the modified safety region or the point leaves the modified working region. Deactivation of the kinematic, outputting of a warning signal, etc. may function as the action.

The method according to the invention can of course also be used for a plurality of points of the kinematic, and advantageously for at least one point per single axle. As a result, the braking vectors and, therefrom the envelope, can be determined in each case for each point. As a result, associated working regions or safety regions can be modified for each point.

The present invention will be explained in greater detail in the following, with reference to FIGS. 1 to 6C which schematically show advantageous embodiments of the invention by way of example and in a non-limiting manner. In the drawings.

Figure 1:
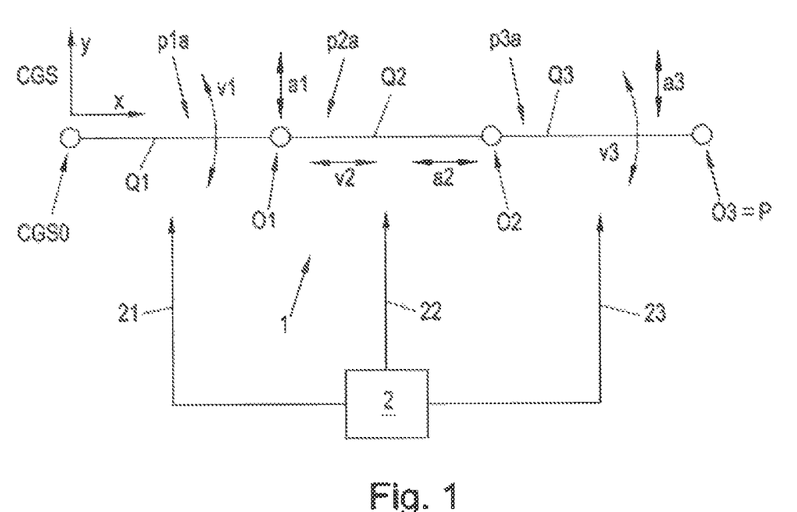
FIG. 1 shows a kinematic formed of three single axles.

FIG. 1 shows a part of a kinematic 1, in this case a serial kinematic, as a one-dimensionally modelled part of a robot arm. In this case, a simplified form of a wire frame model is used to model the kinematic 1. In the example according to FIG. 1, the kinematic 1 is modelled by three punctiform kinematic objects O1, O2, O3 in a kinematics coordinate system CGS, the first kinematic object O1 and the second kinematic object O2 each constituting joint hubs of the robot arm. Three single axles Q1, Q2, Q3 of the kinematic 1 form a kinematic chain and connect the kinematic objects O1, O2, O3 to an origin CGS0 of the kinematics coordinate system CGS, along the kinematic chain. The third kinematic object O3 could for example be a connection point for a further single axle.

In FIG. 1, the first single axle Q1 connects the origin CGS0 to the first kinematic object O1, the second single axle Q2 connects the first kinematic object O1 to the second kinematic object O2, and the third single axle Q3 connects the second kinematic object O2 to the third kinematic object O3. A control unit 2 (hardware and/or software) ensures the movements of the single axles Q1, Q2, Q3 via control lines 21, 22, 23, which single axles may in principle be designed as revolute joint axles or prismatic joint axles. In this case, the single axles Q1, Q2, Q3 can move relative to the origin CGS0. In the present embodiment, the first single axle Q1 and the third single axle Q3 are revolute joint axles, which is symbolized by the arrows transverse to the single axle Q1, Q3. Since the first kinematic object O1 moves in a relative manner together with the first single axle Q1, the first kinematic object O1 is pivoted along a circular path or a circular arc when the first single axle Q1 is moved in relation to the origin CGS0. In this case, the first single axle Q1 covers a circle or a circular sector. In an analogous manner, the third single axle Q3 can pivot the third kinematic object O3, connected thereto, along a circular arc in relation to the second kinematic object O2, while the third single axle Q3 moves along a circular sector with respect to the second kinematic object O2. The possible movements of the single axles Q1, Q3 formed as revolute joint axles are generally restricted to a region of action and can therefore in each case move along a circular sector. If there is no restriction to a region of action, for example if deceleration occurs gradually during a braking process and/or the speed v1, v2, v3 is very high, a revolute joint axle would cover a complete circle.

The second single axle Q2 is formed as a prismatic joint axle, which is indicated by the double arrow in parallel with the second single axle Q2, and allows the second kinematic object O2 to move along a straight line in relation to the first kinematic object O1, over which line the prismatic joint axle can extend and retract.

Since the kinematic 1 forms a kinematic chain, the movements of single axles Q1, Q2, Q3 can of course change the position of single axles Q1, Q2, Q3 connected thereto. As a result, a rotation of the first single axle Q1 of course also brings about a rotation of the second single axle Q2 and of the third single axle Q3, etc. In this case, the origin CGS0 is assumed to be fixed and thus describes the position of a movably mounted joint hub, making a movement of the first single axle Q1 and of the following coupled second and third single axle Q2, Q3 possible.

A braking process is initiated at a braking time, the single axles Q1, Q2, Q3 continuing to move until they reach a standstill. At the braking time, the single axles Q1, Q2, Q3 are at known initial positions p1a, p2a, p3a in each case, and each move at a known speed v1, v2, v3, an angular speed of course also being assumed as the speed in the case of revolute joint axles.

If the braking process is initiated at the braking time, the first single axle Q1 moves from a first initial position p1a to a first end position p1e, the second single axle Q2 moves from a second initial position p2a to a second end position p2e, and the third single axle Q3 moves from a third initial position p3a to a third end position p3e, a specified or calculated minimum deceleration a1, a2, a3 counteracting the relevant speed v1, v2, v3 in each case, the speed v1, v2, v3 of course being understood to be the initial speed at the start of the braking process. When the relevant deceleration a1, a2, a3 acts, the associated speed v1, v2, v3 of course reduces during the braking process. The decelerations a1, a2, a3 result inter alia from the inertia of the single axles Q1, Q2, Q3 and a braking action that can be applied by the kinematic 1, and may be known in advance or determined at the braking time.

The minimum decelerations a1, a2, a3 result in the maximum end positions in each case as end positions p1e, p2e, p1e for the single axles Q1, Q2, Q3, at which end positions said axles are certain to come to a standstill during a braking process. Of course, during the actual braking process the single axles Q1, Q2, Q3 could also be braked more rapidly than at the minimum deceleration a1, a2, a3, and theoretically even immediately (i.e. by an infinitely great deceleration a1, a2, a3). In the case of immediate braking, the end positions p1e, p2e p3e would coincide with the initial position p1a, p2a, p3a, for the relevant single axle Q1, Q2, Q3, at the braking time. However, since the minimum deceleration a1, a2, a3 is used for calculating the end positions p1e, p2e, p3e when determining the brake path, it is possible to ensure that the single axles Q1, Q2, Q3 actually come to a standstill between the initial position p1a, p2a, p3a and the end position p1e, p2e, p3e during an actual braking process.

According to the invention, in the event of a braking process, for a point P that is coupled to a single axle Q1, Q2, Q3, at least one virtual end position p1, . . . , p7 of the point P is determined from an initial position p0 of the point P, a vectorial speed v1 of at least one single axle Q1, Q2, Q3, and a minimum deceleration a1, a2, a3 of at least one single axle Q1, Q2, Q3. In the present embodiment, the third kinematic object O3 located on the third single axle Q3 is considered as the point P, and in the following the brake path for said point P is determined. The brake path corresponds to the region that could be covered by virtual partial movements of the point P during the braking process.

Figures 2A, 2B, 2C, 2D, 2E, 2F, 2G, 2H:
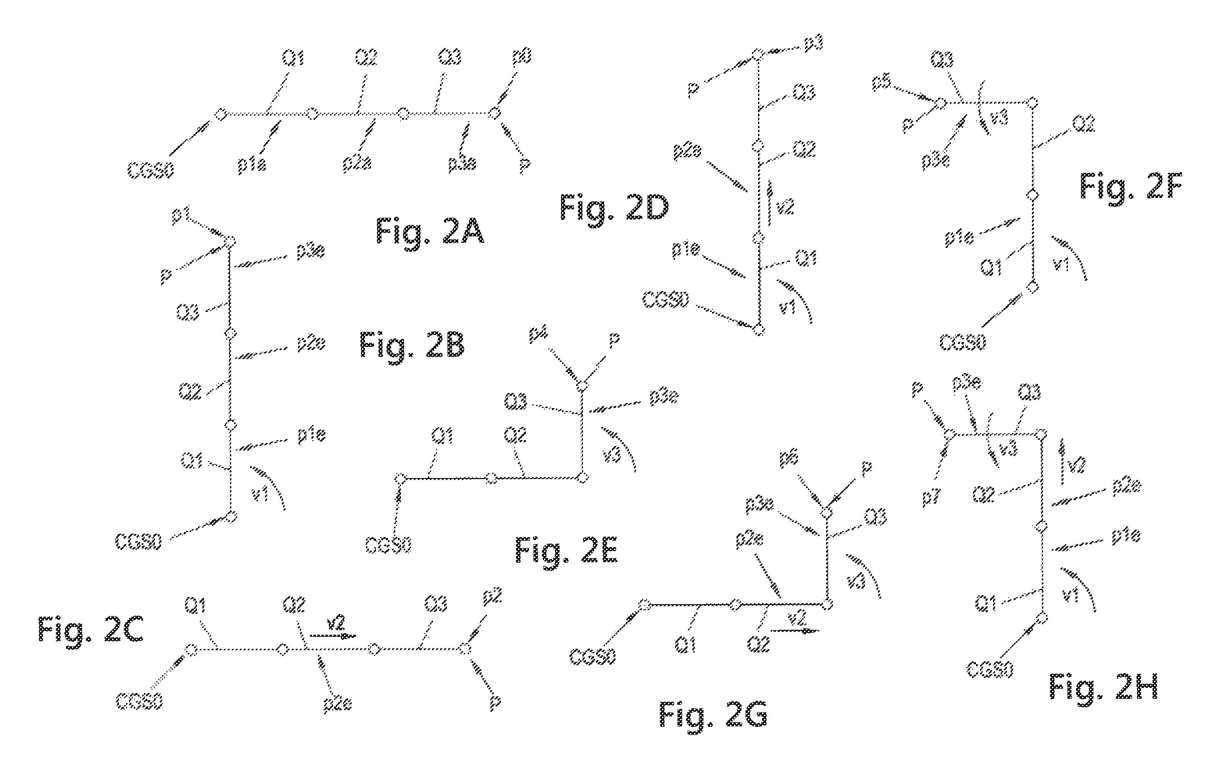
FIG. 2A-H show the single axles in the initial position and in the end positions.

FIG. 2A shows the single axles Q1, Q2, Q3 of the kinematic 1 shown in FIG. 1 in the initial position p1a, p2a, p3a, the point P being located in an initial position p0.

FIG. 2H shows the end positions p1e, p2e, p3e of the single axles Q1, Q2, Q3 which have all been braked at the minimum deceleration a1, a2, a3, the point P being located in the virtual end position p7. The possible, different virtual end positions p1, . . . , p7 of the point can each be formed by varying the decelerations of the single axles Q1, Q2, Q3, i.e. all the initial positions p1a, p2a, p3a and end positions p1e, p2e, p3e. Owing to the possible movements of the single axles Q1, Q2, Q3, there are then always $(2^i-1)$ possible virtual end positions p1, . . . , p7 for a point p, when i is the number of single axles Q1, Q2, Q3 via which the point P is connected to the origin CGS0. In this case, the virtual end positions p1, . . . p7 are considered as a whole, i.e. in relation to the origin CGS0. That is to say that, for the embodiment shown according to FIG. 2, in which the point P corresponds to the third kinematic object O3, $(2^i-1)=(2^3-1)=7$ possible virtual end positions p1, . . . , p7, because the point P (the third kinematic object O3) is connected to the origin via i=3 single axles Q1, Q2, Q3.

Virtual end positions p1, . . . , p7 are then determined. The virtual end positions p1, . . . , p7 describe the possible end positions of the point P when a minimum deceleration a1, a2, a3 occurs, on the basis of individual movement portions of the overall movement (e.g. only the first and second single axle Q1, Q2). The envelope E can be determined from the initial position p0 and the virtual end positions p1, . . . p7. It is also possible, however, (see FIG. 3) to determine braking vectors b1, . . . , b7 which connect the initial position p0 to the possible (in the simplest case at least one) virtual end positions p1, . . . , p7, and to determine the envelope E using the braking vectors b1, . . . , b7.

The braking vectors b1, . . . , b7 which are then also used for determining the envelope E (as described below) can also be formed of a linear combination of basis braking vectors, each basis braking vector being assigned to a moved single axle Q1, Q2, Q3. It is therefore assumed, for each basis braking vector, that the basis braking vectors of non-assigned single axles Q1, Q2, Q3 do not move any further. For a basis braking vector, analogously to the case of a braking vector, the associated virtual end position p1, p2, p4 of the point P is determined from the initial position p0 of the point P, a vectorial speed v1, v2, v3, and the minimum deceleration a1, a2, a3 of only the assigned single axle Q1, Q2, Q3. Then, just like a braking vector, the basis braking vector connects the initial position p0 of the point P to the virtual end position p1, p2, p4 of the point P that is associated therewith.

The virtual end positions p1, p2, p4 of the point P which can be used for determining the associated basis braking vectors are indicated in FIGS. 2B, 2C and 2E. FIG. 2B shows, by way of example, the virtual end position p1 in the event of the first single axle Q1, moved at the first speed v1, being braked at the minimum deceleration a1 (not shown), immediate standstill being assumed for the second single axle Q2 and the third single axle Q3, i.e. the movement of the second single axle Q2 and of the third single axle Q3 is not taken into account. The second single axle Q2 and the third single axle Q3 thus remain in the initial position p2a, p1a (as in FIG. 2A). FIG. 2C in turn shows the virtual end position p2 in the event of the second single axle Q2, moved at the second speed v2, being braked at the minimum deceleration a2 (not shown), it being assumed that the first single axle Q1 and the third single axle Q3 come to an immediate standstill or are not moved. FIG. 2E shows the virtual end position p4 in the event of the third single axle Q3, moved at the third speed v3, being braked at the minimum deceleration a3 (not shown), it being assumed that the first single axle Q1 and the second single axle Q2 come to an immediate standstill or are not moved.

In FIG. 2D, the first single axle Q1 and the second single axle Q2 were braked (at the minimum deceleration a1, a2 which is not shown), and immediate standstill was assumed for the third single axle Q3; in FIG. 2F the first single axle Q1 and the third single axle Q3 were braked (at the minimum deceleration a1, a3 which is not shown), and immediate standstill was assumed for the second single axle Q2; in FIG. 2G the second single axle Q2 and the third single axle Q3 were braked (at the minimum deceleration a2, a3 which is not shown), and immediate standstill was assumed for the first single axle Q1. As mentioned, FIG. 2H discloses braking of the first single axle Q1, the second single axle Q2 and the third single axle Q3 at the minimum deceleration a1, a2, a3 (not shown) in each case. The virtual end positions p3, p5, p6, p7 of the point P, shown in FIGS. 2D, 2F, 2G and 2H, can thus also be shown as linear combinations of the virtual end positions p1, p2, p4 of the point P shown in FIGS. 2B, 2C and 2E.

In FIG. 2, the speeds v1, v2, v3 of course occur only at the start of the braking process, since they are decelerated, thereafter, by the deceleration a1, a2, a3. If no speeds v1, v2, v3 are shown in FIG. 2, this simply means that it is assumed that the associated single axle Q1, Q2, Q3 is braked immediately, and not that they are not moving up to the braking time.

Thus, all possible virtual end positions p1, . . . p7 of the point P of the kinematic 1 during braking are determined. For this purpose, the single axles Q1, Q2, Q3 are assumed, proceeding from the initial positions p1a, p2a, p3a, and the single axles Q1, Q2, Q3 are each decelerated, preferably by a minimum, with the result that they reach the end positions p1e, p2e, p3e. In this case, the virtual end positions p1, . . . p7 of the point P result from varying the end positions p1e, p2e, p3e. Since the virtual end positions p1, . . . , p7 are determined from vectorial speeds v1, v2, v3 and decelerations a1, a2, a3 of the single axles Q1, Q2, Q3, not only the position, but instead also the movement direction, of the Q1, Q2, Q3 is taken into account during the braking process.

Figure 3:
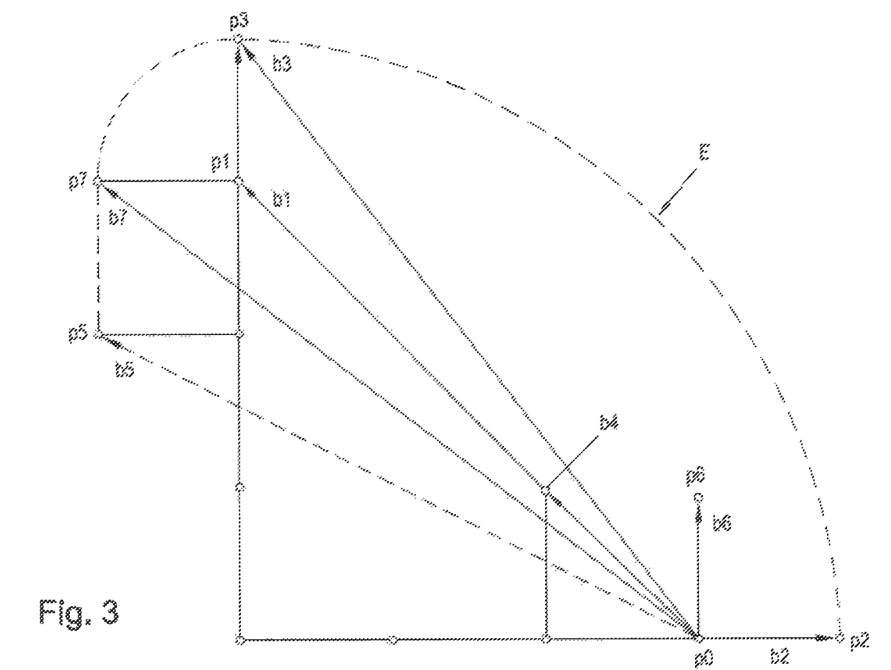
FIG. 3 shows braking vectors of a point, FIG. 4A, B show a virtual partial movement of the point in the form of a circular arc.

FIG. 3 thus shows the initial position p0 of the point P shown in FIG. 2A and the possible virtual end positions p1, . . . , p7 of the point P shown in FIG. 2B-2H in combination, the resulting braking vectors b1, . . . , b7 for the point P being shown. The braking vectors b1, . . . , b7 thus connect the initial position p0 to the determined virtual end positions p1, . . . , p7 of the point P.

In the embodiment shown, braking vectors b1, . . . , b7 are used for determining the envelope E. It would of course also be possible to determine the envelope E if the initial position p0 and the at least one virtual end position p1, . . . , p7 are used directly, without the braking vectors b1, . . . , b7.

As mentioned, the braking vectors b1, . . . , b7 can be determined as linear combinations of the associated basis braking vectors. In FIG. 3, b1 would be a basis braking vector for the first single axle Q1, b2 would be a basis braking vector for the second single axle Q2, and b4 would be a basis braking vector for the third single axle Q3; see FIG. 2.

If a braking vector is formed by a virtual end position p1, . . . , p7 that results only from extending a prismatic joint axle (in FIG. 3 for example the (basis) braking vector b2), the relevant braking vector b1, . . . , b7 (in this case the braking vector b2), as a straight connection between the initial position p0 and the virtual end position (here p2), corresponds to the actual trajectory of the point P during the braking movement when the second single axle Q2 is decelerated at the second minimum deceleration a2 and the first and third single axles Q1, Q3 are not moved.

In the case of a revolute joint axle, a circular arc of course results as the virtual partial movement when the single axle connected thereto is moved. As mentioned, the actual trajectory of the point P is unknown. The virtual partial movements of the point P, in contrast, are determined on the basis of individual movements of the single axles Q1, Q2, Q3, articulated movements, or a combination of movements, under the effect of the minimum deceleration a1, a2, a3, at an initial speed v1, v2, v3.

The braking region of the point P is determined, according to the invention, by means of an envelope E. The envelope E is a one-dimensional (e.g. in the case of a movement of just a prismatic joint axle), two-dimensional or three-dimensional object which bounds the determined braking vectors b1, . . . , b7 and the extent of which is calculated from the braking vectors b1, . . . , b7.

In the simplest design, the envelope E can thus bound exactly the family of braking vectors b1, . . . , b7, with the result that the extent of the envelope E is minimized. However, this is expediently only if the virtual partial movements are not located outside the braking vectors b1, . . . , b7, as is the case for example in prismatic joint axles. The envelope E could also be formed as the smallest bounding object of the family of possible virtual partial movements.

Although the virtual partial movements are generally unknown, they can be calculated from the braking vectors, usually with significant computational effort.

It is usually not sufficient to simply relate the initial position p0 and the virtual end positions p1, . . . , p7 by means of braking vectors b1, . . . , b7, since, as mentioned, the virtual partial movement usually deviates from the braking vectors b1, . . . , b7.

The virtual partial movements can also be determined by means of intermediate positions of the point P between the respective virtual end positions p1, . . . , p7, for example by means of the virtual end positions p1, . . . , p7 also being connected to vectors and the envelope E being calculated therefrom. A possible envelope E that bounds the virtual partial movements is shown in a dashed line in FIG. 3.

Figures 4A, 4B:
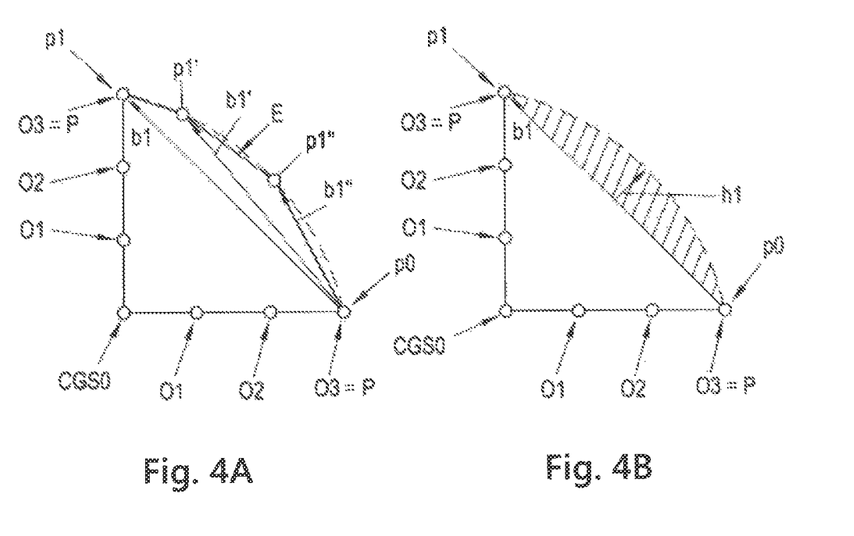

A virtual partial movement of the point P deviates from the respective (basis) braking vectors b1, . . . , b7 which are formed by pivoting a revolute joint axle. A virtual partial movement of the point P, i.e. of the kinematic object O3 which movement is given by way of example and which, owing to only the first single axle Q1 being rotated, describes a circular arc, is shown in FIG. 4A and FIG. 4B. As can be seen, the braking vector b1 (a basis braking vector, since only the first single axle Q1 was moved) connects the initial position p0 to the virtual end position p1.

As shown in FIG. 4A, for the point P, at least one virtual end position p', p1" of the point P can be determined from an initial position p0 of the point P, a vectorial speed v1 of at least one single axle Q1, Q2, Q3, and a further deceleration a1', a1" of at least one single axle Q1, Q2, Q3, which deceleration is greater than the minimum deceleration a1, a2, a3. In this case, a first further end position p1' which results from a first further deceleration at, and a second further end position p1" which results from a second further deceleration a1", are taken into account. A first further braking vector b1' which connects the initial position p0 to the first further virtual end position p1', and a second further braking vector b1" which connects the initial position p0 to the second further virtual end position p1" are determined. The extent of the envelope E can be calculated or approximated from the first braking vector b1, and the first and second further braking vectors b1', b1". Of course, the extent of the envelope E can also be calculated from the initial position p0, the at least one end position p1, and the at least one virtual end position p1', p1" without calculating the braking vector b1 or the at least one further braking vector b1', b1".

In this case, therefore, not only the minimum deceleration a1, a2, a3 is taken into account, but instead also further decelerations a1', a1" that are greater than the minimum deceleration a1. The more further decelerations a1', a1", and therefore the more further braking vectors b1', b1", are determined, the more accurately the virtual partial movement can be approximated using the further end positions p1', p1" or the further braking vectors b1', b1". In the event of calculating an infinite number of further braking vectors b1', b1", the virtual partial movement is approximated exactly using an infinite number of infinitesimal increments of the further deceleration a1', a1", extending from the minimum deceleration a1 to an infinite deceleration. If few further braking vectors b1', b1" are calculated, the deviation still present between the end positions p1, p1" and the virtual partial movement must be taken into account when determining the envelope E, for example by an additional suitable expansion of the extent of the envelope E, similar to using the preferably direction-independent correction value h, which will be described below with reference to the first rectangle R1.

Figure 5A:
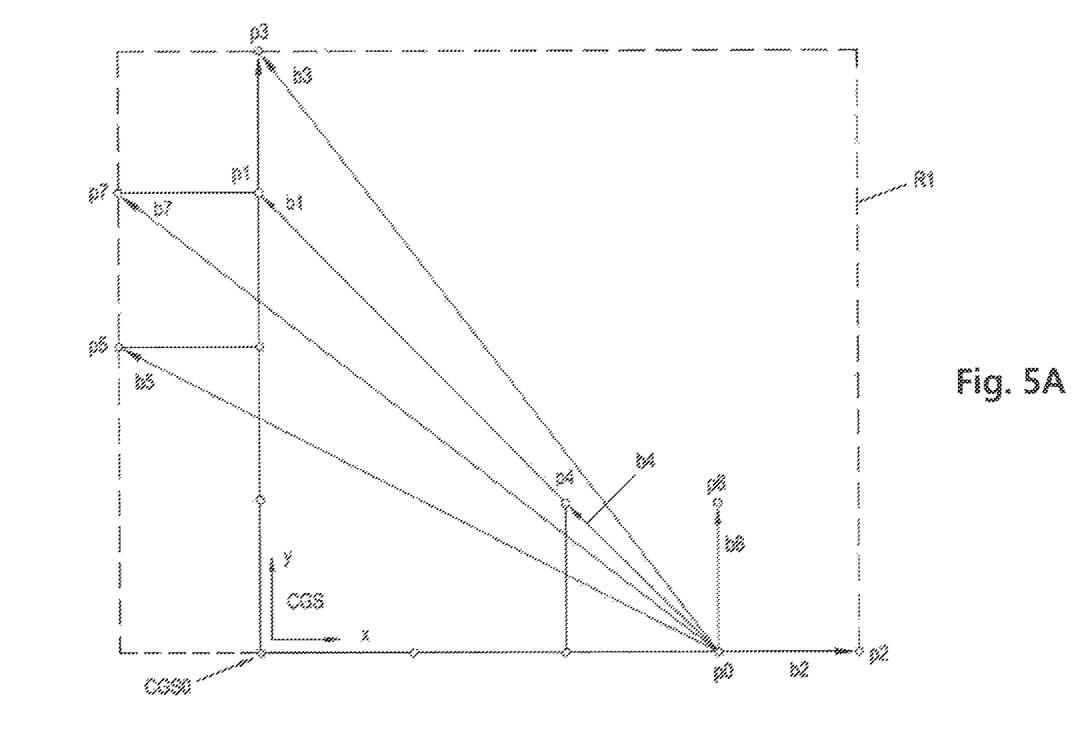
FIG. 5A shows an envelope expanded to a first rectangle.

However, the envelope E can also advantageously be calculated from the braking vectors b1, . . . , b7 or the initial position p0 and virtual end positions p1, . . . , p7 in that the envelope E is calculated as a first rectangle R1 which is a minimum bounding rectangle of the braking vectors b1, . . . , b7 and the sides of which rectangle are in parallel with the kinematics coordinate system CGS, as shown in FIG. 5A.

Figure 5B:
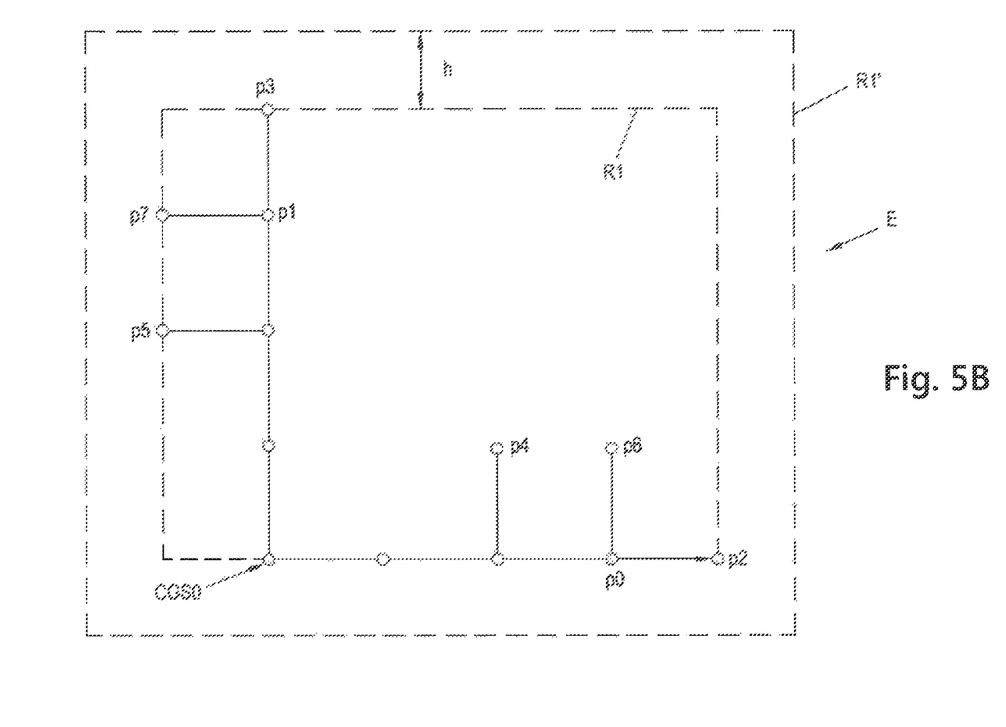
FIG. 5B shows an envelope expanded using a correction value.

However, the first rectangle R1, as the envelope E, is preferably expanded by a correction value h which at least takes account of a deviation of the braking vectors b1, . . . , b7 from the virtual partial movements of the point P from the initial position p0 into the respective virtual end positions p1, . . . , p7, to an expanded first rectangle R1' as the envelope E (FIG. 5B).

As can be seen in FIG. 4B, the braking vector b1 deviates from the dashed virtual partial movement by a circular segment, shown hatched, having a circular segment height h1. As a result, the above correction value h can be determined as the sum of all the circular segment heights h1. The circular segment heights h1 each describe the deviation of basis braking vectors b1, . . . , b7, assigned to revolute joint axles, with respect to the relevant circular arc-shaped virtual partial movement. Thus, for the kinematic 1 shown, the circular segment height which describes the deviation of the fourth basis braking vector b4 from the associated virtual partial movement would also have to be taken into account.

In order to determine the respective circular segment heights h1, for example known geometrical or trigonometrical methods (sine rule, etc.) can be used, it being possible for the initial position p0 and virtual end positions p1, . . . , p7, as well as axle lengths, distances from the origin CGS0, etc. to be used. Of course, the envelope can be determined using the further decelerations a1', a1" and a first rectangle R1 comprising a minimum bounding rectangle R1 of the braking vectors b1, . . . , b7, and/or a rectangle R1' expanded by the correction value h.

FIG. 5B shows an envelope E that is a first rectangle R1' expanded by a correction value h (for example as the sum of the circular segment heights h1). The positions of the kinematic objects O1, O2, O3 are merely indicated in FIG. 5A and FIG. 5B.

It would of course also be possible to calculate just one minimum bounding rectangle R1 for the virtual partial movement of the point P. However, as mentioned, the virtual partial movements themselves are more difficult to calculate than the braking vectors and the associated circular segment heights.

Direction-independent brake path portions can also be determined for the single axles Q1, Q2, Q3, which path portions can bring about movement of the single axles Q1, Q2, Q3 in all spatial directions. Direction-independent brake path portions can result, for example, on account of a position tolerance which describes a position deviation of a determined braking vector b1, . . . , b7 from the actual position of the point P. Since the envelope E bounds all the braking vectors b1, . . . , b7 of the kinematic 1, the envelope E or the first rectangle R1 can be expanded again, for example in that the correction value h is adjusted further, by taking account of the direction-independent brake path portions.

The envelope E can be transformed into a working space coordinate system WCS in which a working space W comprising a safety region SS of the kinematic 1 and/or a working region WS of the kinematic 1 is located. The working space W, or the safety region SS and/or working region WS, can advantageously be associated with just one point P, it being possible for a plurality of assigned working spaces W, or safety regions SS and/or working region WS, to be provided in each case for further points P. It is alternatively also possible for a braking region to be composed of a plurality of points P and for a working space W, or a safety region SS and/or working region WS, to subsequently be calculated for a plurality of points P. However, this is far more conservative and may also be more CPU-intensive. Usually, the braking region is determined and the WS/SS adjusted for each relevant point P. Each point thus has a different WS/SS.

Alternatively, it is also possible to combine the individual braking regions to form a single "worst case braking region" and to adjust the WS/SS just once. The points P having an identical WS/SS are then checked. This is simpler, but more conservative.

Figures 6A, 6B, 6C:
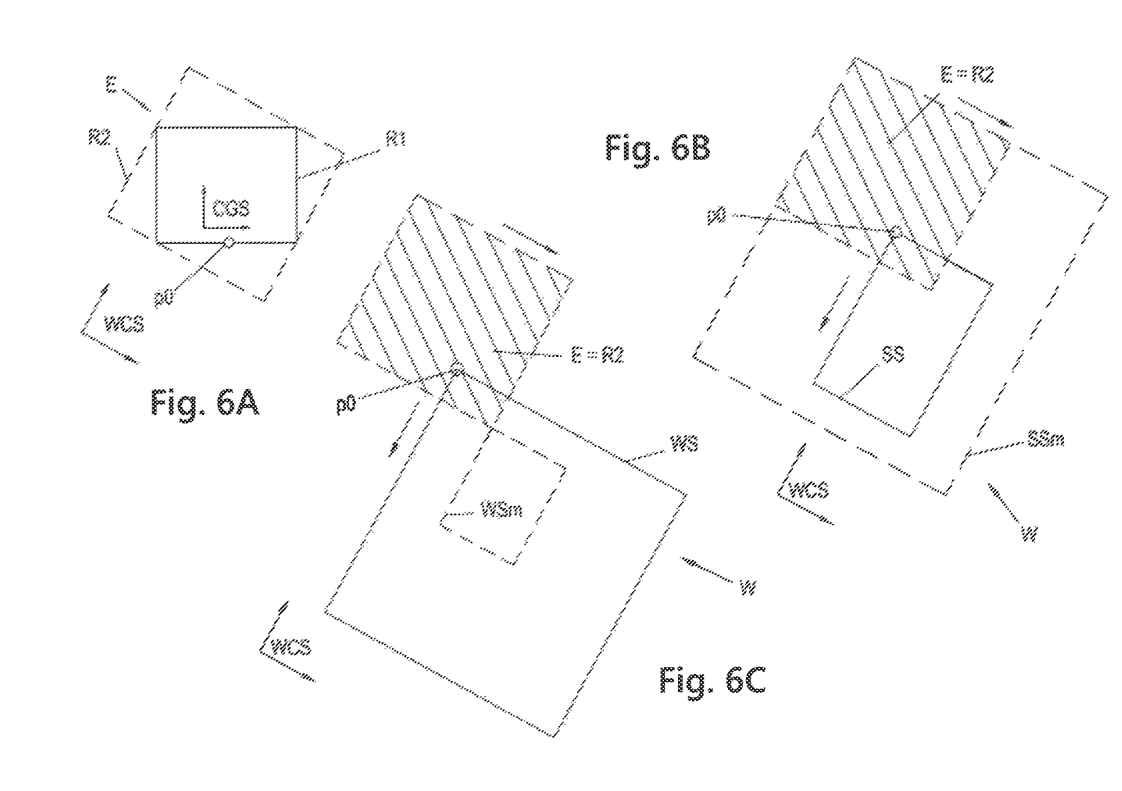
FIG. 6A shows an envelope transformed in a working space.
FIG. 6B shows a modified safety region.
FIG. 6C shows a modified working region.

In the working space W, the safety region SS of the kinematic 1 can be expanded by means of the envelope E and/or a working region WS of the kinematic 1 can be reduced by means of the envelope E, resulting in a modified safety region SSm or a modified working region WSm. The envelope E may be expanded to a second rectangle R2, the sides of which touch the corners of the first rectangle R1 and are in parallel with the working space coordinate system WCS, as shown in FIG. 6A. It is of course also possible for the first rectangle R1 to be expanded to a first expanded rectangle R1' using the correction value h, and for the first expanded rectangle R1' to be used for determining the second rectangle R2.

The safety region can be modified in that the considered initial position p0 of the point P is moved along the boundaries of the safety region SS and the modified safety region SSm is formed from the sum of the safety region SS and the envelope E, as is shown in FIG. 6B. The safety region SS is thus expanded by the envelope E shifted on the basis of the point P, with the result that the safety region SS is increased to the modified safety region SSm.

The modified working region WSm can be formed analogously, from the difference between the working region WS and the envelope E, as shown in FIG. 6C. In this case, the working region WS is reduced by the envelope E shifted on the basis of the point P, with the result that the working region WS is reduced to the modified working region WSm.

In summary, for a point P, preferably a modelled kinematic object O1, O2, O3, of a kinematic 1, the maximum virtual end positions p1, . . . , p7 are determined at a (minimum) deceleration a. Furthermore, an envelope E which bounds the initial position p0 and the virtual end positions p1, . . . , p7 is calculated. It is also possible for braking vectors b1, . . . , b7 that connect the initial position p0 to the respective virtual end positions p1, . . . , p7 to be formed, and for an envelope E bounding the braking vectors b1, . . . , b7 to be calculated from the braking vectors b1, . . . , b7. A first rectangle R1 that bounds the braking vectors b1, . . . , b7 or the initial position and the virtual end positions p1, . . . , p7 may be formed, and optionally expanded by a correction value h. The correction value h can take account of the deviation of the braking vectors b1, . . . , b7 from the virtual partial movements, as well as direction-independent brake path portions, etc. The envelope E can furthermore be transformed into a working space coordinate system WCS and used for adjusting working regions WS or safety regions SS.

In the event of checking the collision of the point P with the safety region S, or a check of whether the point P leaves a working region WS, only a collision between a zero-dimensional or one-dimensional object and a two- or three-dimensional working region WS or safety region SS has to be considered, which is far more efficient than checking the collision of two two-dimensional objects, as would be necessary when monitoring an entire three-dimensional kinematic 1.

The invention has been explained above with reference to the example of a two-dimensional kinematic. However, a kinematic usually allows for a three-dimensional movement. However, the determination according to the invention of the braking region of a point P of the kinematic can be easily expanded to the three-dimensional case. Instead of using rectangles in two-dimensional space, in this case, analogously, cuboids can be used in three-dimensional space in order to represent the envelope E.

The method according to the invention can of course be used for a plurality of points P of the kinematic 1. Advantageously, at least one point P per single axle Q1, Q2, Q3 is considered, furthermore for each point P, according to the invention braking vectors b1, . . . , b7 or an initial position and virtual end positions p1, . . . , p7, an envelope E determined therefrom, and optionally further working regions WS or safety regions SS, being modified for each point P.

The invention claimed is:

1. A method for controlling a kinematic that is modelled in a kinematics coordinate system by hingedly interconnected single axles, at least one of the single axles being connected to an origin of the kinematics coordinate system and at least one of the single axles moving relative to the origin, the method comprising:
   initiating, within the modelled kinematics at a braking time, a braking process of a point that is coupled to one of the single axles;
   determining at least one virtual end position of the point from an initial position of the point, a vectorial speed of at least one single axle, and a minimum deceleration of at least one single axle; and determining a braking region of the point using an envelope that bounds the initial position and the at least one virtual end position for the at least one moving axis, wherein an extent of the envelope is calculated from at least the initial position and the at least one virtual end position for the at least one moving axis, and the braking region being taken into account when controlling the kinematic.

2. The method according to claim 1, wherein the extent of the envelope is calculated from the initial position, the at least one virtual end position, and a virtual partial movement resulting therefrom.

3. The method according to claim 1, wherein the at least one virtual end position of the point is determined from the initial position of the point, a vectorial speed of each single axle moved, and a deceleration of each moved single axle.

4. The method according to claim 1, wherein at least one further virtual end position of the point is determined for the point, from the initial position, the vectorial speed of the at least one single axle, and at least one further deceleration of the at least one single axle that is greater than the minimum deceleration of the at least one single axle, and wherein the braking region of the point is determined using the envelope of the initial position and the at least one virtual end position and the at least one further virtual end position, the extent of the envelope being calculated from the initial position, the virtual end position, and the at least one further virtual end position.

5. The method according to claim 1, further comprising:
determining at least one braking vector, which connects the initial position to the at least one virtual end position, and
determining the envelope from the at least one braking vector.

6. The method according to claim 5, wherein the braking vectors are formed by a linear combination of basis braking vectors, each basis braking vector being assigned to one single axle and connecting the initial position of the point to an associated virtual end position of the point, the associated virtual end position of the point being determined from the initial position of the point, a vectorial speed of the assigned single axle, and the minimum deceleration of the assigned single axle, the assumption being made, for each basis braking vector, that non-assigned single axles do not move any further.

7. The method according to claim 5, wherein one of:
the envelope is calculated as a first rectangle, which is a minimum bounding rectangle of the braking vectors, and sides of the rectangle are in parallel with the kinematics coordinate system, or
the envelope is calculated as a first cuboid, which is a minimum bounding cuboid of the braking vectors, and sides of the cuboid are in parallel with the kinematics coordinate system.

8. The method according to claim 7, wherein the first rectangle or the first cuboid is expanded, by a correction value which at least takes account of a deviation of the braking vectors from virtual partial movements of the point from the initial position into the respective virtual end positions, to an expanded first rectangle or to a first expanded first cuboid, and in that the envelope is expanded to the expanded first rectangle or the first expanded first cuboid.

9. The method according to claim 7, wherein the first rectangle or the first cuboid is expanded, by a correction value which at least takes account of the deviation of the braking vectors from the virtual partial movements of the point from the initial position into the respective virtual end positions, to an expanded first rectangle or a first expanded first cuboid, in that a safety region of the kinematic and/or a working region of the kinematic is provided in a working space using a working space coordinate system, wherein the envelope is expanded to a second rectangle or a second cuboid, the sides of which touch the corners of the first rectangle or of the first cuboid and are in parallel with the working space coordinate system, and
wherein a safety region of the kinematic is expanded by the envelope and/or a working region of the kinematic is reduced by the envelope, resulting in a modified safety region and/or a modified working region.

10. The method according to claim 1, wherein, using a working space coordinate system, in a working space, the safety region of the kinematic is expanded by the envelope and/or a working region of the kinematic is reduced by the envelope, resulting in a modified safety region and/or a modified working region.

11. The method according to claim 10, wherein the initial position of the point is moved along boundaries of the safety region or of the working region and the modified safety region is formed from a sum of the safety region and the envelope, and/or the modified working region is formed by a difference between the working region and the envelope.

12. The method according to claim 10, wherein the modified safety region and/or the modified working region is monitored, and an action is taken as soon as the point enters the modified safety region and/or the point leaves the modified working region.

13. The method according to claim 1, wherein the extent of the envelope is calculated from the initial position, the virtual end position being determined for the at least one moving single axis, and a virtual partial movement resulting therefrom.

14. The method according to claim 1, wherein the virtual end position being determined for the at least one moving single axis of the point is determined from the initial position of the point, a vectorial speed of each single axle moved, and a deceleration of each moved single axle.

15. A method for controlling a kinematic that is modelled in a kinematics coordinate system by hingedly interconnected single axles, at least one of the single axles being connected to an origin of the kinematics coordinate system and at least one of the single axles moving relative to the origin, the method comprising:
in an event of a braking process for a point that is coupled to one single axle, determining at least one virtual end position of the point from an initial position of the point, a vectorial speed of at least one single axle, and a minimum deceleration of at least one single axle,
determining a braking region of the point using an envelope of the initial position and of the at least one virtual end position, the extent of the envelope being calculated from the initial position and the at least one virtual end position, and the braking region being taken into account when controlling the kinematic,
determining at least one braking vector, which connects the initial position to the at least one virtual end position; and
determining the envelope from the at least one braking vector,
wherein one of:
the envelope is calculated as a first rectangle, which is a minimum bounding rectangle of the braking vectors, and sides of the rectangle are in parallel with the kinematics coordinate system, or the envelope is calculated as a first cuboid, which is a minimum bounding cuboid of the braking vectors, and sides of the cuboid are in parallel with the kinematics coordinate system, and wherein the first rectangle or the first cuboid is expanded, by a correction value which at least takes account of the deviation of the braking vectors from the virtual partial movements of the point from the initial position into the respective virtual end positions, to an expanded first rectangle and/or a first expanded first cuboid, in that a safety region of the kinematic or a working region of the kinematic is provided in a working space using a working space coordinate system, wherein the envelope is expanded to a second rectangle or a second cuboid, the sides of which touch the corners of the first rectangle or of the first cuboid and are in parallel with the working space coordinate system, and wherein a safety region of the kinematic is expanded by the envelope and/or a working region of the kinematic is reduced by the envelope, resulting in a modified safety region and/or a modified working region.

16. A method for controlling a kinematic that is modelled in a kinematics coordinate system by hingedly interconnected single axles, at least one of the single axles being connected to an origin of the kinematics coordinate system and at least one of the single axles moving relative to the origin, the method comprising:

initiating, within the modelled kinematics at a braking time, a braking process of a point that is coupled to one of the single axles, determining a virtual end position of the point for the at least one moving single axis;

wherein the virtual end position of the point is determined from an initial position of the point, which is taken by the point in the kinematics coordinate system at the braking time, from a vectorial speed of the at least one moving single axis and from a minimum deceleration of the at least one moving single axis, wherein the vectorial speed, which corresponds an initial speed of the at least one moving single axis at the braking time, takes into account an absolute value and a direction of the initial speed and the minimum deceleration counteracts the vectorial speed of the at least one moving single axis in a guaranteed decelerating manner; and determining a braking region of the point using an envelope of the initial position and of the virtual end position being determined for the at least one moving axis, an extent of the envelope being calculated from the initial position and the virtual end position being determined for the at least one moving axis, and the braking region being taken into account when controlling the kinematic.

* * * * *